United States Patent

Kim

[11] Patent Number: 5,933,394
[45] Date of Patent: Aug. 3, 1999

[54] APPARATUS AND METHOD FOR STORING REPRODUCTION RELATED INFORMATION IN DIGITAL VERSATILE DISC PLAYER

[75] Inventor: Young-Chul Kim, Seoul, Rep. of Korea

[73] Assignee: LG Electronics, Inc., Seoul, Rep. of Korea

[21] Appl. No.: 08/880,171

[22] Filed: Jun. 20, 1997

[30] Foreign Application Priority Data

Jun. 21, 1996 [KR] Rep. of Korea ................ 96-22887

[51] Int. Cl.$^6$ ................................................. G11B 17/22
[52] U.S. Cl. ........................................ 369/32; 386/126
[58] Field of Search ............................. 309/32, 275.3, 309/58, 54, 47, 48; 386/69, 70, 83, 125, 126

[56] References Cited

U.S. PATENT DOCUMENTS

| | | | |
|---|---|---|---|
| 5,245,600 | 9/1993 | Yamauchi et al. | 386/126 |
| 5,619,338 | 4/1997 | Nakai et al. | 386/70 |
| 5,657,415 | 8/1997 | Yamada | 386/69 |
| 5,673,359 | 9/1997 | Ohta et al. | 386/125 |
| 5,691,972 | 11/1997 | Tsuga et al. | 369/32 |
| 5,734,788 | 3/1998 | Nonomura et al. | 386/126 |

*Primary Examiner*—Tan Dinh

[57] ABSTRACT

An apparatus and a method for storing reproduction related information in a digital versatile disc includes temporarily storing information read from a disc in a memory, compressing, classifying, clearing, and converting the information, and storing only a minimum amount of the information into a second memory based on user selections, thereby reducing the size of the memory and the fabricating cost. The apparatus stores reproduction related information in the temporary memory from a higher level to a lower level. Therefore, only a minimum amount of information is stored in the memory, enabling a reduction in the size and fabricating cost of the memory.

24 Claims, 3 Drawing Sheets

APPARATUS AND METHOD FOR STORING REPRODUCTION RELATED INFORMATION IN DIGITAL VERSATILE DISC PLAYER

FIELD OF THE INVENTION

The invention relates to information management in a digital versatile disc player, and more particularly, relates to an apparatus and a method for storing reproduction related information recorded on a Digital Versatile Disc or Digital Video Disc (DVD).

BACKGROUND OF THE INVENTION

FIG. 1 is a block diagram of a conventional apparatus for storing reproduction related information according to prior art. As shown, the storing apparatus comprises a pickup 102 for reading data recorded on a disc 101 and outputting high-frequency signals; a high-frequency processor 103 for decoding the high-frequency signals output from the pickup, correcting errors thereof, and for outputting video signals; a navigator 104 for extracting a title search pointer, program chain information, and program reproducing information from the signals output from the high-frequency processor 103; and a memory 105 for storing the information output from the navigator 104.

The operation of the conventional apparatus will be explained hereinafter in detail with reference to FIG. 1.

The pickup 102 reads data recorded on the disc 101 and outputs high-frequency signals, and then the high-frequency processor 103 decodes the high-frequency signals, corrects errors and outputs original video signals to the navigator 104.

Thereafter, the navigator 104 extracts reproduction related information (i.e., the title search pointer, program chain information, and program reproducing information) from the original video signals output by the high-frequency processor 103, and outputs the reproduction related information extracted to the memory 105. Thereafter, the memory 105 stores the reproduction related information output by navigator 104.

If a user inputs a key to reproduce a previous or a following image of the present image while the DVD player is reproducing image data recorded on the disc 101, the navigator 104 reads the information stored in the memory 105. At this point, if the information extracted by the navigator 104 is displayed through a signal processing procedure, the user selects desired information.

Accordingly, a servo (not shown) moves the pickup 102 to a position on the disc 101 corresponding to the selected information, the pickup 102 reads the data recorded on the corresponding position on the disc 101, and then the data read by the pickup 102 and corresponding to the selected information is displayed on a screen.

However, since the conventional apparatus extracts massive amounts of reproduction related information and stores it in its memory, the memory of a conventional apparatus must have a large capacity. Thus, the fabricating cost of the apparatus and the size of the memory are increased.

SUMMARY OF THE INVENTION

It is an object of this invention to provide an apparatus and a method for storing reproduction related information in a digital versatile disc which may reduce the size of the memory by storing reproduction related information read by a pickup to a temporary memory, compressing, classifying, clearing, and converting the information, and storing only the minimum of information required for reproduction in a second memory.

To achieve the above objects, one aspect of the present invention is to provide an apparatus for storing reproduction related information in a digital versatile disc which comprises a pickup for reading data recorded on a disc; a video processing means for decoding the data read by the pickup, correcting errors thereof, and outputting video signals; an information detecting means for receiving the video signals of the video processing means and detecting reproduction related information and outputting them as output signals in an order; and a storing means for receiving the output signals of the information detecting means and storing a minimum of information required for program search.

Further, the information detecting means may comprise a navigating means for extracting title search pointer, program chain information or program reproducing information from the video signals output from the video processing means and outputting information extracted; and an information selecting means for selecting desired information by input of a user and outputting signals of the desired information to the navigating means.

The storing means may comprise a first storing means for storing temporarily the information output from the navigating means; and a second storing means for storing the desired information selected by the information selecting means among the information stored in the first storing means.

According to the present invention, the minimum of information stored in the storing means may be program chain information.

A method for storing reproduction related information in a digital versatile disc according to the present invention is comprised of the steps of extracting title search pointers from data read from a disc and storing them temporarily; selecting a desired title search pointer among the title search pointers and storing the selected title search pointers; finding a position on the disc where program chain information corresponding to the selected title search pointer is located and storing temporarily the program chain information; selecting a desired program chain information among the program chain information and storing the selected program chain information; and finding a position on the disc where program reproducing information corresponding to the selected program chain information is located and storing the program reproducing information.

Other and further objects, features and advantages of the present invention will become apparent from the detailed description given hereinafter. However, it should be understood that the detailed description and specific examples, while indicating preferred embodiments of the invention, are given by way of example only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

A detailed description of the present invention will be given with reference to the accompanying drawings.

DESCRIPTION OF THE INVENTION

Figure 1:
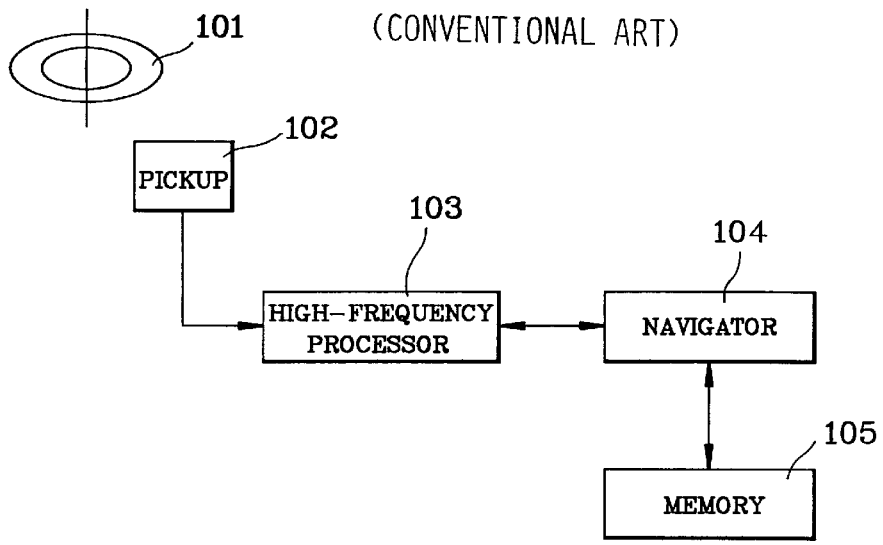
FIG. 1 is a block diagram of a conventional apparatus for storing reproduction related information.
Figure 2:
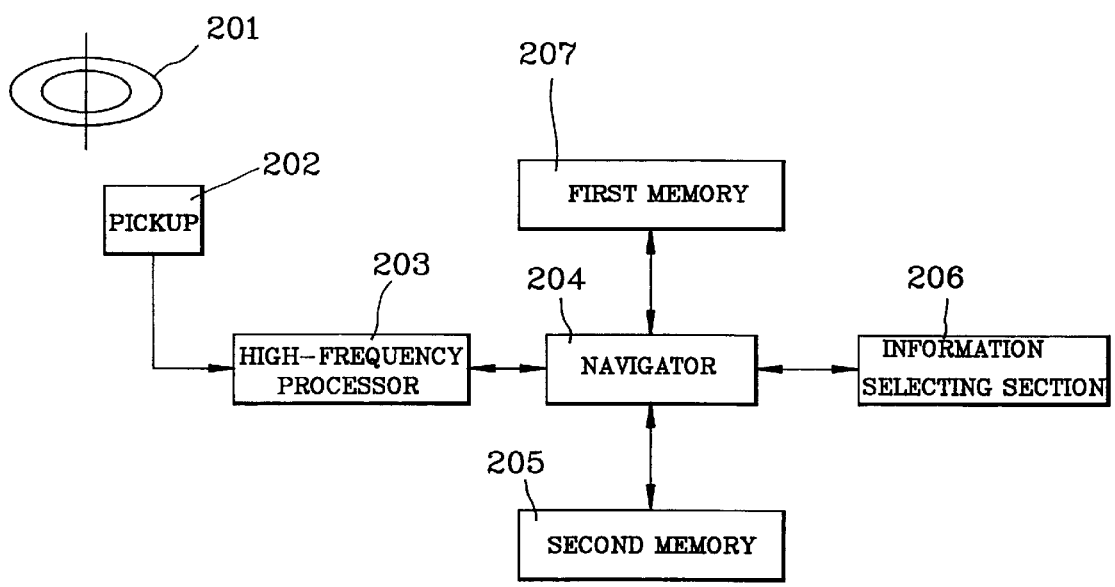
FIG. 2 is a block diagram of an apparatus for storing the reproduction related information according to the present invention.

FIG. 2 is a block diagram of one embodiment of an apparatus for storing the reproduction information according to the present invention. As shown, the apparatus according to the present invention includes a pickup 202 for reading data recorded on a disc and outputting high-frequency signals; a high-frequency processor 203 for decoding the high-frequency signals output from the pickup, correcting errors thereof; and outputting video signals, a navigator 204 for extracting a title search pointer, program chain information; or program reproducing information from the video signals output from the high-frequency processor 203 and outputting information extracted in an order; a first memory 207 for temporarily storing the information output from the navigator 204; an information selecting section 206 for selecting desired information when the information stored in the first memory is displayed; and a second memory 205 for storing the desired information selected by the information selecting section 206.

The operation of the apparatus according to the invention will be explained hereinafter with reference to FIG. 2.

First, the pickup 202 reads the data recorded on the disc 201 and outputs the high-frequency signals based on that data to the high-frequency processor 203. The high-frequency processor 203 decodes the signals output by the pickup 201 and corrects errors thereof, and then outputs video signals based on the corrected decoded output signals to the navigator 204.

Therefore the navigator 204 receives the video signals from the high-frequency processor 203, extracts video manager information from the video signals, and outputs the video manager information extracted to the first memory 207. The first memory 207, temporarily stores the video manager information, received from navigator 204 while the video manager information is displayed on a screen.

At this time, the video manger information temporarily stored in the first memory 207 is related to a number of title search pointers which indicate the positions of corresponding program titles.

Figure 3:
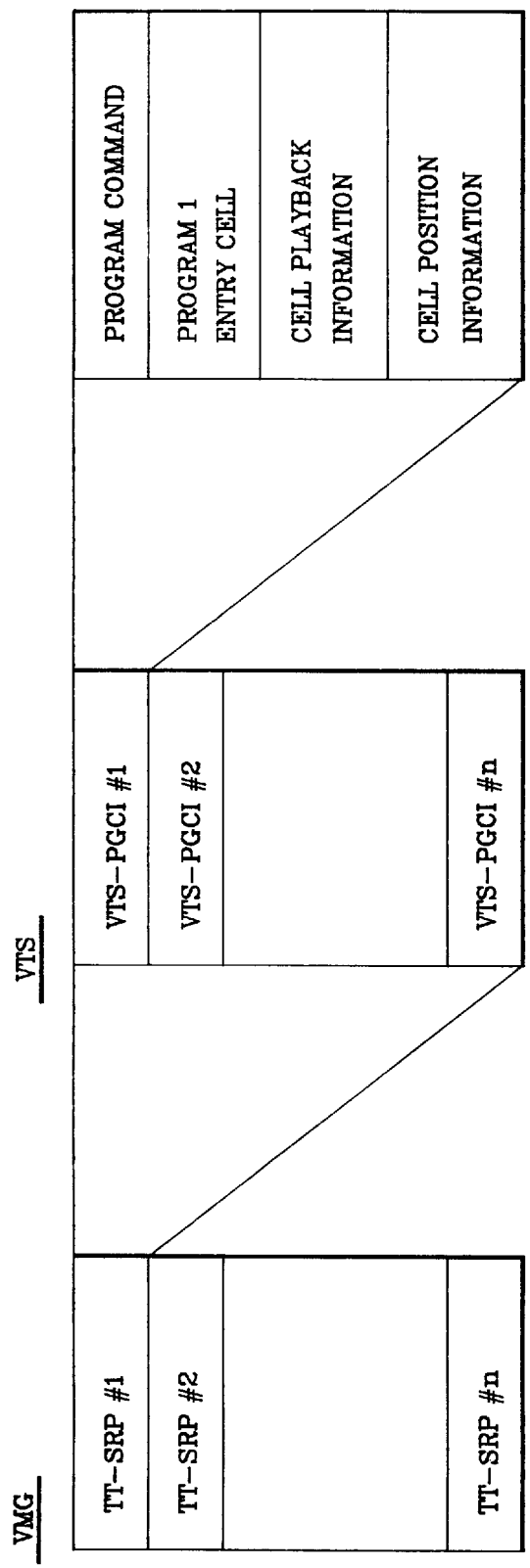
FIG. 3 illustrates an arrangement of the title search pointer, program chain information, and program reproducing information recorded on a disc.

Next, as shown in FIG. 3, when a user selects a desired title search pointer from the title search pointers represented by the video manager information the information selecting section 206 sends signals indicating the desired title search pointer to the navigator 204.

Thereafter, the navigator 204 reads the desired title search pointer selected from the first memory 207 and outputs the desired title search pointer to the second memory 205.

And then, the second memory 205 stores selected the desired title search pointer selected.

When the servo (not shown) moves the pickup 202 to a position on the disc corresponding to the title search pointer stored in the second memory 205, the pickup 202 reads the data of the program chain information recorded on the position and outputs the program chain information to the high-frequency processor 203. The high-frequency processor 203 decodes the information, corrects errors thereof, and outputs video signals to the navigator 204. The navigator 204 extracts the program chain information from the video signals and outputs the program chain information to the first memory 207. The program chain information output from the navigator 204 is temporarily stored in the first memory 207 and simultaneously displayed on the screen.

When the user selects one of the program chain information displayed on the screen, the information selecting section 206 sends signals corresponding to the program chain information selected to the navigator 204. The navigator 204 reads only the information selected by the user from the first memory 207 according to the signals of the information selecting section 206 and outputs the information to the second memory 205. The second memory 205 then stores the program chain information output by navigator 204, which program chain information corresponds to the information selected by the user.

Next, the servo (not shown) moves the pickup 202 to a position on the disc corresponding to the program chain information stored in the second memory 205, the pickup 202 reads the data of the program reproducing information recorded on the position of the disk corresponding to the program chain information selected and stored in the second memory 205, and outputs the information to the high-frequency processor 203. The high-frequency processor 203 decodes the program reproducing information, and corrects errors thereof, and outputs the corrected decoded video signals to the navigator 204. The navigator 204 then extracts cell information corresponding to the program reproducing information from the video signals and outputs the cell information to the second memory 205.

In FIG. 3, the cell information corresponding to the program reproducing position information comprises, for example, a program command, an entry cell of program #1, a cell playback information, a cell position information or the like.

After the extraction and the storage has been completed, if the user inputs a key to reproduce a previous or following image of the present image while the DVD player is reproducing the image data recorded on the disc 201, the navigator 204 reads the information stored in the memory 205.

At this point, if the information read from memory 205 by the navigator 204 is displayed, the user selects desired information. Accordingly, the servo (not shown) moves the pickup 202 to the position on the disc 201 corresponding to the desired information selected by the user, and then, the pickup 202 reads the data recorded on the corresponding position in the disc 201.

Figure 4:
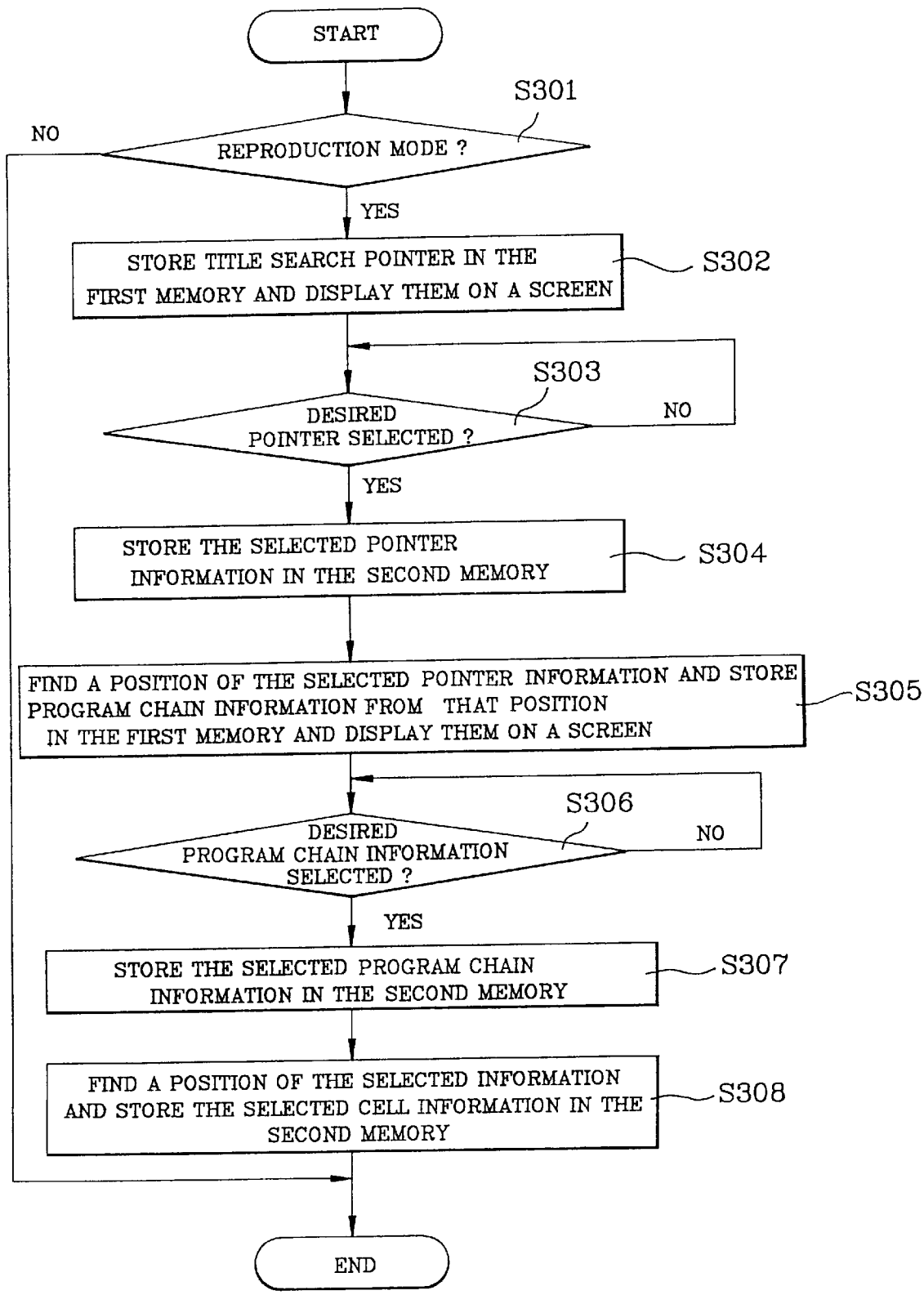
FIG. 4 is a flow chart showing a method for storing the reproduction related information according to the present invention.

FIG. 3 illustrates an arrangement of the title search pointer, the program chain information, and the program reproducing information recorded on the disc, and FIG. 4 is a flow chart showing an embodiment of the method for storing the reproduction information according to this invention. Thus, an embodiment of the method for storing the reproduction information according to this invention is explained with reference to FIGS. 3 and 4.

First, at step S301, the navigator 204 determines if a user has selected reproduction mode. If the reproduction mode has been selected, step S302 is followed, otherwise the program terminates. At the step S302, the information selecting section 206 sends signals to the navigator 204, and the navigator 204 extracts the title search pointers (TT-SRP#1~TT-SRP#n) from the output signals of the high-frequency processor 203 and outputs them to the first memory 207. The title search pointers output from the navigator 204 are stored in the first memory 207 and simultaneously displayed on the screen.

Next, at step S303, the navigator 204 determines if the user has selected one of the title search pointers. If so, the program progresses to step S304; if not, the step S303 is repeated until the user selects one of the title search pointers.

At the step S304, for example, if the title search pointer 'TT-SRP#1' is selected, the information selecting section 206 sends signals to the navigator 204, and the navigator 204 reads the title search pointer (TT-SRP#1) from the first memory 207 and outputs the pointer to the second memory 205. The second memory 205 stores the title search pointer.

Next, at step S305, the servo (not shown) moves the pickup 202 to the position on the disc where the program chain information corresponding to the title search pointer (TT-SRP#1) is located, and the navigator 204 extracts the program chain information (VTS-PGCI#1VTS-PGCI#n) from the output signals of the high-frequency processor 203 and outputs them to the first memory 207. The program chain information output from the navigator 204 are stored in the first memory 207 and simultaneously displayed on the screen.

At step S306, the navigator 204 determines if the user has selected one of the program chain information. If so, the program progresses to step S307; if not, the step S306 is repeated until the user selects one of the program chain information.

At step S307, for example, if the program chain information 'VTS-PGCI#1' is selected, the information selecting section 206 sends the signals to the navigator 204, and the navigator 204 reads the program chain information (VTS-PGCI#1) from the first memory 207 and outputs the information to the second memory 205. The second memory 205 stores the program chain information (VTS-PGC#1).

Finally, at step S308, the servo (not shown) moves the pickup 202 to a position on the disc where the program reproducing information corresponding to the program chain information (VTS-PGC#1) is located, and the navigator 204 extracts the program reproducing information from output signals of the high-frequency processor 203 and outputs the information to the second memory 205. Then, the second memory 205 stores the program reproducing information. Thus, the operation for storing the reproduction related information is completed.

As described above, the apparatus according to this invention stores reproduction related information in a temporary memory from higher levels to lower levels. Therefore, according to this invention, because only minimum information are stored, the size of the memory and the fabricating cost are reduced.

As will be evident to those skilled in the art, various modifications of this invention can be made or followed in light of the foregoing disclosure without departing from the spirit of the disclosure or from the scope of the claims.

What is claimed is:

1. An apparatus for storing reproduction related information in a digital versatile disc, comprising:

a pickup for reading data recorded on a disc;

high-frequency processing means for decoding the data read by said pickup, correcting errors thereof, and outputting a digital data stream;

information detecting means for receiving the digital data stream of said high-frequency processing means, detecting reproduction related information, and outputting desired reproduction related information, wherein said information detecting means comprises:

navigating means for extracting information including at least one of a title search pointer, program chain information, and program reproducing information from said digital data stream output from said high-frequency processing means; and information selecting means for enabling selection of the desired reproduction related information from among the reproduction related information based on user input and for outputting the desired reproduction related information;

a first storing means for temporarily storing the information extracted by said navigating means; and a second storing means for storing the desired information selected by said information selecting means from among the information stored in said first storing means.

2. A method for storing reproduction related information in a digital versatile disc, comprising:

extracting title search pointers from data read from a disc and temporarily storing the title search pointers in a first memory;

selecting a desired title search pointer among said title search pointers and storing the selected title search pointer in a second memory;

finding a position on the disc where program chain information corresponding to said desired title search pointer is located and temporarily storing the program chain information recorded at said position in the first memory;

selecting a desired program chain information among said program chain information and storing the desired program chain information in the second memory; and finding a position on the disc where program reproducing information corresponding to said desired program chain information is located and storing the program reproducing information that is recorded at said position of the disc in the second memory.

3. The method of claim 2, wherein the program reproducing information includes at least one of a program command, an entry cell of a first program, cell playback information, and cell position information.

4. The method of claim 2, wherein selecting the desired title search pointer comprises:

displaying the title search pointers; and enabling selection of the displayed title search pointers.

5. The method of claim 2, wherein selecting the desired program chain information comprises:

displaying the program chain information; and enabling selection of the displayed program chain information.

6. An apparatus for storing reproduction related information in a digital versatile disc, comprising:

a digital data stream generating device generating a digital data stream based on information stored on a disc;

an information detecting unit receiving the digital data stream generated by said digital data stream generating device, and detecting and outputting reproduction related information based on the digital data stream received; and a storage unit storing desired reproduction related information from among the reproduction related information detected by the information detecting unit, wherein the desired reproduction related information includes selected information from among the reproduction related information output by the information detecting unit.

7. The apparatus recited by claim 6, further comprising:

a memory for temporarily storing the reproduction related information output by the information detecting unit before the desired reproduction related information is stored in the storage unit.

8. The apparatus recited by claim 6, wherein said information detecting unit comprises:

a selector enabling selection of the desired reproduction related information to be output from among the reproduction related information detected by the information detecting unit.

9. The apparatus recited by claim 8, wherein the selection is made by a user.

10. The apparatus recited by claim 8, wherein said information detecting unit further comprises:

a navigator extracting at least one of a title search pointer, program chain information, and program reproducing information from said video signals output from said video signal generating device.

11. The apparatus recited by claim 10, further comprising:

a memory for temporary storing the reproduction related information detected by the information detecting unit before the desired reproduction related information is stored in the storage unit, wherein said navigator transfers the desired reproduction related information from the memory to the storage unit based on output from the selector.

12. The apparatus as recited in claim 6, wherein the video signal generating device comprises:

a pickup reading data recorded on a disc; and a high-frequency processing unit decoding the data read by said pickup, correcting errors of the decoded data, and outputting video signals based on the corrected decoded data.

13. The apparatus as recited in claim 6, wherein the desired reproduction related information that is stored in the storage device is program chain information.

14. The apparatus of claim 6, wherein the reproduction related information includes information that is related to reproduction of data from the disc.

15. A method for storing reproduction related information in a digital versatile disc, comprising:

generating a digital data stream based on information stored on a disc;

detecting and outputting reproduction related information based on the a digital data stream generated; and storing desired reproduction related information from among the reproduction related information detected and output, wherein the desired reproduction related information includes selected information from among the reproduction related information detected and output.

16. The method recited by claim 15, further comprising:

temporarily storing the reproduction related information output in a temporary memory before the desired reproduction related information is stored in a storage device.

17. The method recited by claim 16, wherein detecting reproduction related information comprises:

enabling selection of the desired reproduction related information to be output from among the reproduction related information detected.

18. The method recited by claim 17, wherein the selection is made by a user.

19. The method recited by claim 17, wherein detecting reproduction related information further comprises:

extracting at least one of a title search pointer, program chain information, and program reproducing information from said digital data stream generated.

20. The method recited by claim 15, further comprising:

temporarily storing the reproduction related information in a temporary memory before the desired reproduction related information is stored in a storage device, wherein the desired reproduction related information is transferred from the temporary memory to the storage device based on a selection of the desired reproduction related information from among the reproduction related information detected.

21. The method as recited in claim 15, wherein generating the digital data stream comprises:

reading data recorded on a disc using a pickup; and decoding the data read by said pickup, correcting errors of the decoded data, and outputting the digital data stream based on the corrected decoded data.

22. The method as recited in claim 15, wherein the desired reproduction related information is program chain information.

23. The method of claim 15, wherein the reproduction related information includes information that is related to reproduction of data from the disc.

24. The apparatus of claim 2, wherein the reproduction related information includes information that is related to reproduction of data from the disc.

* * * * *